United States Patent
Klement et al.

(10) Patent No.: US 7,837,015 B2
(45) Date of Patent: Nov. 23, 2010

(54) HOLDING DEVICE FOR THE BRAKE LININGS OF A DISK BRAKE AND ASSOCIATED BRAKE LINING

(75) Inventors: Roland Klement, Haunshofen (DE); Rudolf Fischer, Erding (DE); Tobias Linke, Bad Vilbel (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/114,292

(22) Filed: May 2, 2008

(65) Prior Publication Data

US 2008/0277215 A1   Nov. 13, 2008

Related U.S. Application Data

(63) Continuation of application No. PCT/EP2006/010517, filed on Nov. 2, 2006.

(30) Foreign Application Priority Data

Nov. 3, 2005   (DE) .................. 10 2005 052 439

(51) Int. Cl.
   *F16D 65/40* (2006.01)
(52) U.S. Cl. .................. 188/73.38; 188/73.35
(58) Field of Classification Search .............. 188/73.31, 188/73.35–73.38, 258, 250 R
   See application file for complete search history.

(56) References Cited

U.S. PATENT DOCUMENTS 4,498,564 A   2/1985   Tamura

2004/0016610 A1   1/2004   Morris
2004/0168868 A1*  9/2004   Thomas .................. 188/73.37

FOREIGN PATENT DOCUMENTS

| DE | 1 425 232 | 2/1969 |
|---|---|---|
| DE | 38 39 957 A1 | 5/1990 |
| DE | 10 2004 053 026 A1 | 5/2006 |
| EP | 1 375 952 A2 | 1/2004 |
| EP | 1 441 141 B1 | 7/2004 |
| GB | 2 267 941 A | 12/1993 |
| JP | 57-163735 A | 10/1982 |
| JP | 11-201199 A | 7/1999 |
| JP | 2002-122167 A | 4/2002 |
| JP | 2006-118543 A | 5/2006 |
| WO | WO 92/00465 A1 | 1/1992 |

OTHER PUBLICATIONS

International Search Report dated Jan. 24, 2007 including English translation (Six (6) pages.

* cited by examiner

*Primary Examiner*—Melanie Torres Williams
(74) *Attorney, Agent, or Firm*—Crowell & Moring LLP

(57) ABSTRACT

A brake lining for a disc brake of a road vehicle has a blade-type retaining spring for the lining. At least two peripheral lining springs are situated on each brake lining, adjacent to the retaining spring, and exert a compressive force on at least some sections of the periphery of the lining carrier. The springs are configured in such a way that they respectively cover an edge region of the brake lining carrier, with the latter having at least two corner regions.

12 Claims, 1 Drawing Sheet

HOLDING DEVICE FOR THE BRAKE LININGS OF A DISK BRAKE AND ASSOCIATED BRAKE LINING

This application is a continuation of international application PCT/EP2006/010517, filed Nov. 2, 2006, the entire disclosure of which is incorporated herein by reference, and claims priority to German patent application 10 2005 052 439.7, filed Nov. 3, 2005.

Cross-reference is hereby made to the U.S. national phase applications of international applications PCT/EP2006/010512 (published as WO 2007/051613 A1 on May 10, 2007) and PCT/EP2006/010516 (published as WO 2007/051617 A1 on May 10, 2007).

BACKGROUND AND SUMMARY OF THE INVENTION

This invention relates to a holding device for brake linings of a disk brake of a road vehicle, in which the disk brake is provided with brake linings and a brake caliper with brake lining shafts, into which a brake lining and, optionally, one pressure distributor plate is inserted, with each brake lining having a lining carrier and lining material. The holding device includes a holding bracket engaging over two of the brake linings that lie opposite one another on both sides of the brake disk, and a prestressed, leaflike lining holding spring supported on the holding bracket and acting on a circumferential face of the lining carrier of each brake lining.

A wide variety of disk brake embodiments for commercial vehicles is known. A lining holding spring that acts on a region of a brake lining assigned to holding bracket (see, for example, international PCT document WO 92/00465 A1) is intended to fix the brake lining within the brake lining shaft and, moreover, to compensate for unavoidable tolerances. The brake lining is pressed into the brake lining shaft by a prestress, and rattling noises are to be reduced or completely eliminated by this arrangement. This arrangement has proven itself effective, but it is still considered to be a disadvantage that the brake material digs into the lining carrier due to unavoidable oscillations. This undesirable property is attributed to the material pairing.

German document DE 10 2004 053 026 A1, European document EP 1 441 141 B1, German documents DE 38 39 957 A1 and DE 1 425 232 A, and U.S. Pat. No. 4,498,564 are also identified as prior art.

One object of this invention is to eliminate the above-described problem using a simple design.

This object is achieved by arranging on the brake lining, in addition to the lining holding spring, at least two lining surround springs that exert a compressive force, at least in sections, on the circumferential face of each brake lining. The lining surround springs are configured in such a way that they cover in each case one edge region of the brake lining carrier, which edge region comprises at least two corner regions of the brake lining. For a lining carrier that has, in essence, only four corner regions, all four corner regions are preferably enclosed by at least one, or two or more, lining surround springs. An embodiment of this type, having two lining surround springs and a lining holding spring, is considered unknown in the prior art.

Therefore, at least one lining surround spring, which exerts a compressive force at least in regions (in the mounted position in the brake) on the circumferential face of each brake lining, is preferably arranged on that brake lining. The lining surround spring can be configured in one piece or multiple pieces.

The lining surround spring is not necessarily a spring which runs around the brake lining carrier by 360° completely or even in one piece. Each lining surround spring preferably encloses at least two of the lining carriers. The lining holding spring and the lining surround springs are preferably "substantially" to run around the lining carrier, that is to say, it or they is or are to cover more than half of the edge regions of the lining carriers.

The lining surround spring preferably comprises a material having a relatively high hardness, such as steel, as a result of which the effect of the lining material digging into the lining carrier is largely reduced.

Moreover, a drop in the degree of efficiency of the disk brake over the service life is also reduced.

The combination of the lining holding spring and the lining surround springs produces an optimized sprung mounting in the brake carrier shaft and/or in the brake caliper shaft, as a result of which the wear of components that are movable relative to one another and noise are reduced.

To avoid corrosion between the brake material and the brake carrier during a relatively long standstill of a road vehicle, the lining surround springs may be produced from a corrosion-resistant steel, and, in particular, stainless steel.

Optimally, the lining surround springs are supported at least on one of the two lateral circumferential faces that lie opposite one another and on one circumferential face of the brake lining that lies opposite the lining holding spring. Here, the regions of the lining surround springs supported on the shorter, lateral circumferential faces cause the brake lining to be supported in the brake lining shaft laterally in a sprung manner.

The spring action is optimized if the regions assigned to the circumferential faces of the lining surround springs are of undulating design, with the result that, in each case, the lining surround spring makes contact with the central regions of the circumferential face.

However, in one alternative form, each brake lining may be assigned two lining surround springs that extend over those lateral circumferential faces of the brake lining, which lie opposite one another, and over the two outer and lateral regions of the brake lining, which lie opposite the lining holding spring. This saves material.

It is also possible to assign the brake lining with only one lining surround spring that extends over the region outside the lining holding spring. The lining holding spring in this embodiment should also make contact with at least the central regions of those lateral faces of the brake lining which lie opposite one another. The region which lies opposite the lining holding spring can be designed in such a way that the lining surround spring makes contact with at least the lateral regions. Moreover, it is also possible to have the lining surround spring make contact only with the central region of the face which lies opposite the lining holding spring. It is also conceivable for the lining surround spring to make contact with both the lateral regions and the central region of that face of the brake lining which lies opposite the lining holding spring.

As an alternative, the lining holding spring and the lining surround spring can be configured as an integral shaped part. This embodiment makes a progressive characteristic curve possible for the lining holding spring and, as a result, permits load-dependent suspension.

Furthermore, depending on the requirements and circulating distance, the lining surround spring or the lining surround springs can be fixed positively on the respective brake linings.

In an embodiment with one lining surround spring, the end regions assigned to the lining holding spring can be angled away to the outside or can engage behind an angled-away tab of the lining carrier.

If an embodiment is equipped with two lining surround springs, the ends which face the lining holding spring are likewise angled away to the outside and engage behind the angled-away tabs of the lining carrier.

The other ends of the lining surround springs, which lie opposite the lining holding spring, are of eyelet-shaped design and engage in recesses or in tapered sections of the brake lining. This also achieves positive fixing.

In a particularly advantageous way, each lining surround spring is configured as a flat or leaf spring, in relation to the cross section.

One embodiment of the invention will be described in greater detail using the appended drawing.

DETAILED DESCRIPTION OF THE INVENTION

Figure 1:
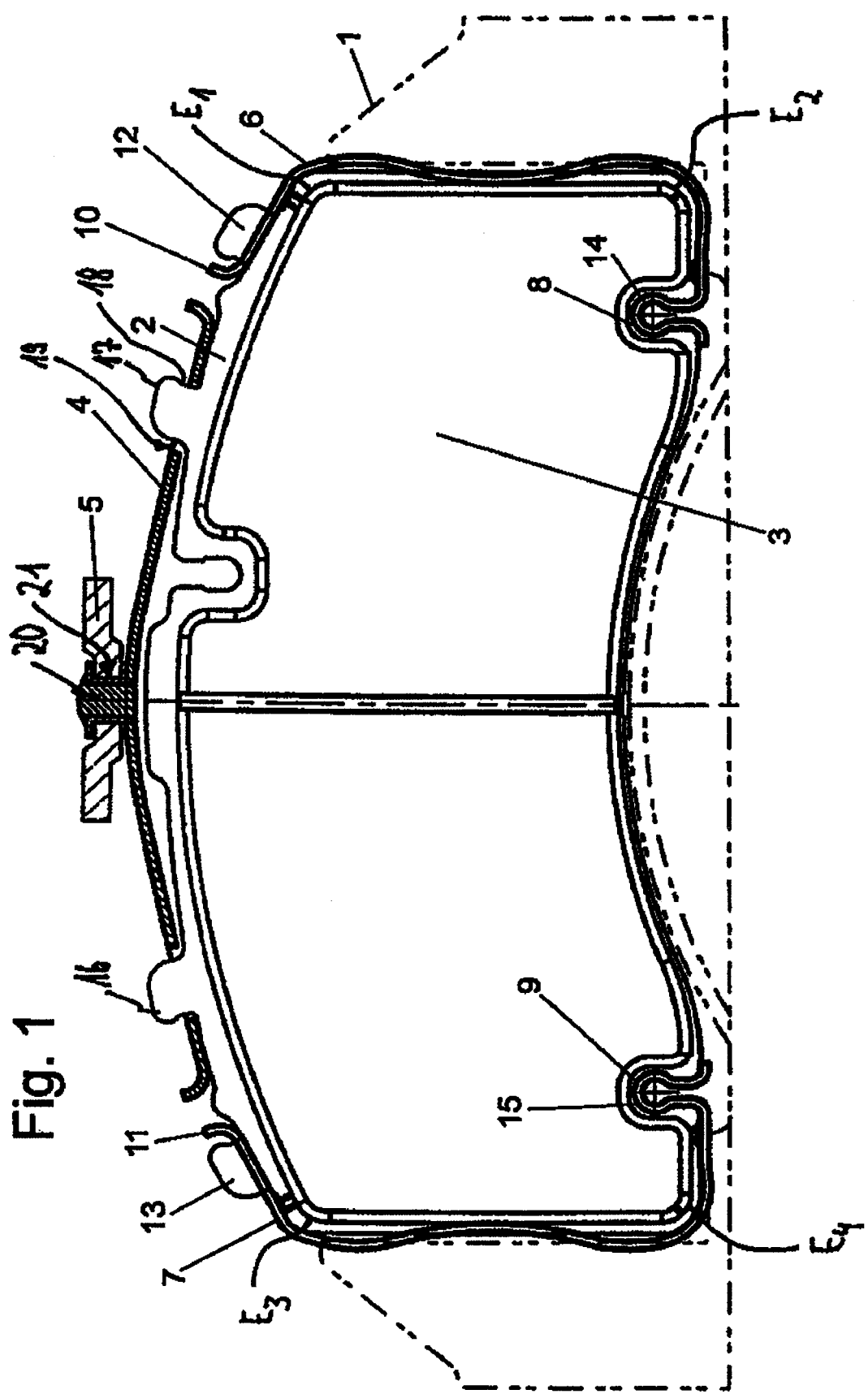
FIG. 1 is a front view of a holding device for a brake lining according to the invention.

The arrangement which is shown in FIG. 1 is inserted into a brake lining shaft 1 (shown in basic form) of the brake carrier.

The arrangement comprises a brake lining having a lining carrier 2 that carries lining material 3.

A lining holding spring 4, which is configured as a leaf spring and is arranged on a holding bracket 5, is arranged on the lining carrier on its circumferential side facing away from the brake carrier in the mounted position. This lining holding spring 4 serves to fix the brake lining in the brake lining shaft 1 and, moreover, to compensate for radial tolerances. This lining holding spring 4 represents a part of the lining surround springs.

In the embodiment shown, furthermore, two lining surround springs 6, 7, which lie between the lining shaft and the lining carriers 2 and exert compressive forces on the lining carriers 2, are used on the lining carriers 2. These lining surround springs 6, 7 are configured as shaped springs and act at least on those lateral regions of the lining carrier which lie opposite one another and on the side which lies opposite a lining holding spring 4 in the edge regions. The lining surround springs 6, 7 enclose, in each case, two edges E1 and E2 or E3 and E4 of the brake lining. Overall, all four corner regions E1, E2, E3, E4 of the lining carrier, which has four corner regions here, are enclosed by the lining surround spring or the lining surround springs.

As FIG. 1 shows, the lining surround springs 6, 7 make contact with the lining carrier 2 only in sections over a defined central region.

Those end regions of the lining surround springs 6, 7 which are assigned to the lining holding spring 4 are angled away to the outside, with the result that webs 10, 11 are produced. The webs 10, 11 engage behind angled-away tabs 12, 13 of the lining carrier 2, as a result of which the end regions, which are configured as webs 10, 11, are connected positively to the lining carrier 2.

Furthermore, the lining carrier 2 preferably has tabs 16, 17 which serve to fix the lining holding spring 4. Here, the tabs 16, 17 have undercuts 18, in which the lining holding spring 4 is held in cutout regions 19 in a manner which is secured against jumping out.

The other end regions are of eyelet-shaped design and exert compressive forces on that side of the brake lining which lies opposite the lining holding spring 4. These eyelets 14, 15 engage in recesses 8, 9 or tapered sections of the brake lining, preferably on its underside or on the side which faces away from the holding spring. The combination of the lining holding spring 4 with the lining surround springs 6, 7 reinforces the suspension of the brake lining in the brake lining shaft 1 by the generation of oscillations, as a result of which the wear of the components that are movable relative to one another and noise are reduced.

In contrast to the embodiment which is shown, the arrangement can also be equipped with one lining surround spring 6 or 7, which is integral and completely encloses the region of the ends of the lining holding spring 4, making contact with at least the lateral regions in the central region and with the side which lies opposite the lining holding spring 4 in the lateral regions.

As an alternative, it is also possible to configure the lining holding spring 4 and the lining surround springs 6, 7 as an integral shaped part. This reduces the number of parts.

Each lining surround spring 6, 7 should comprise a relatively hard material, since the action is reinforced as a result.

The invention is not restricted to the exemplary embodiment which is shown. It is essential that one or two lining surround springs 6, 7 is or are inserted into the brake lining shaft 1, which lining surround spring or springs 6, 7 exerts/exert compressive forces on those faces of the brake linings which are not gripped by the lining holding spring 4. Furthermore, it is expedient for each lining surround spring to comprise a steel having a relatively high hardness, and for that steel to be corrosion-resistant.

At least one lining holding spring 4 of one of two brake linings of the disk brake engages with a projection 20 and/or pin into a slot 21 in the holding bracket 5. This slot 21 extends parallel to the brake disk axis (perpendicularly with respect to the plane of the drawing here), and the lining holding spring 4 is guided displaceably in the slot, with the result that a structural unit comprising the hold-down bracket 5 and the lining holding spring 4 is produced in addition. This is advantageous, since the lining holding spring 4 is additionally guided and secured as a result.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A holding device for brake linings of a disk brake of a road vehicle, the disk brake being provided with the brake linings, a brake caliper with brake lining shafts, into which, in each case, one brake lining and, optionally, one pressure distributor plate is inserted, each brake lining having a lining carrier and a lining material, the holding device comprising:

a holding bracket engaging over two of the brake linings that lie opposite one another on both sides of the brake disk, a prestressed, leaflike lining holding spring supported on the holding bracket and acting on a circumferential face of the lining carrier of each brake lining, and at least two lining surround springs that exert a compressive force at least in sections on the circumferential face of the lining carrier of each brake lining, each of the lining surround springs including a web at a first end that engages behind a tab on the circumferential face of its respective lining carrier and an eyelet at a second end that is receivable in a recess in the circumferential face of said respective lining carrier, wherein the lining surround springs are configured in such a way that they cover or enclose in each case one edge region of the lining carrier, and wherein the edge region comprises at least two corner regions of the lining carrier.

2. The holding device as claimed in claim 1, wherein the lining carrier has substantially only four corner regions, and wherein all of the corner regions are enclosed by at least one of the lining surround springs.

3. The holding device as claimed in claim 1, wherein the at least two lining surround springs are supported on two lateral circumferential faces that lie opposite one another and on a circumferential side of the brake lining that lies opposite the lining holding spring.

4. The holding device as claimed in claim 1, wherein at least one lining surround spring is of undulating design and makes contact at least with a central region of lateral circumferential faces of the brake lining.

5. The holding device as claimed in claim 1, wherein each brake lining is surrounded by two of the lining surround springs, and wherein end regions of the lining surround springs that lie opposite the lining holding spring engage around associated lateral regions of a circumferential face of the brake lining.

6. The holding device as claimed in claim 1, wherein an end of each lining surround spring assigned to the lining holding spring is angled away outside to form said web, and wherein the eyelet lies opposite the web.

7. The holding device as claimed in claim 1, wherein the lining holding spring and the at least two lining surround springs are of multiple piece configuration.

8. The holding device as claimed in claim 1, wherein the lining holding spring and the at least two lining surround springs are configured as an integral shaped part.

9. The holding device as claimed in claim 1, wherein each lining surround spring is configured as a flat or leaf spring.

10. The brake lining as claimed in claim 1, wherein at least lateral faces of each brake lining makes contact with two of the lining surround springs in central regions and a face of the brake lining or the lining carrier that lies opposite the lining holding spring also makes contact with two of the lining surround springs.

11. The brake lining as claimed in claim 1, wherein each lining surround spring is a flat or leaf spring.

12. The brake lining as claimed in claim 1, wherein a characteristic curve is of progressive design and represents load-dependent suspension as a result.

* * * * *